Feb. 6, 1923.
A. A. BULL.
FAN PULLEY.
FILED APR. 8, 1920.
1,444,302
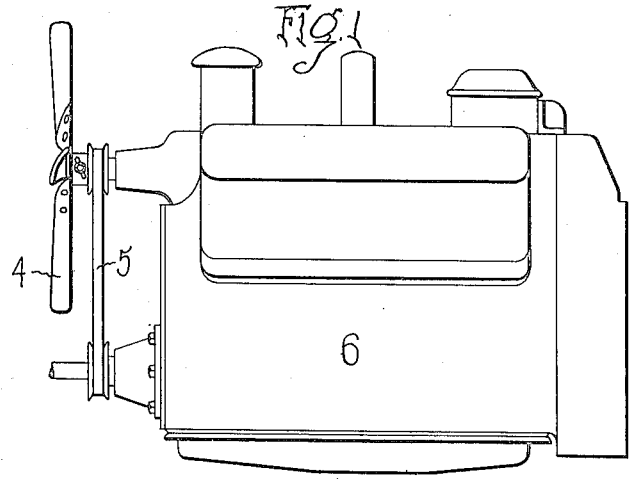
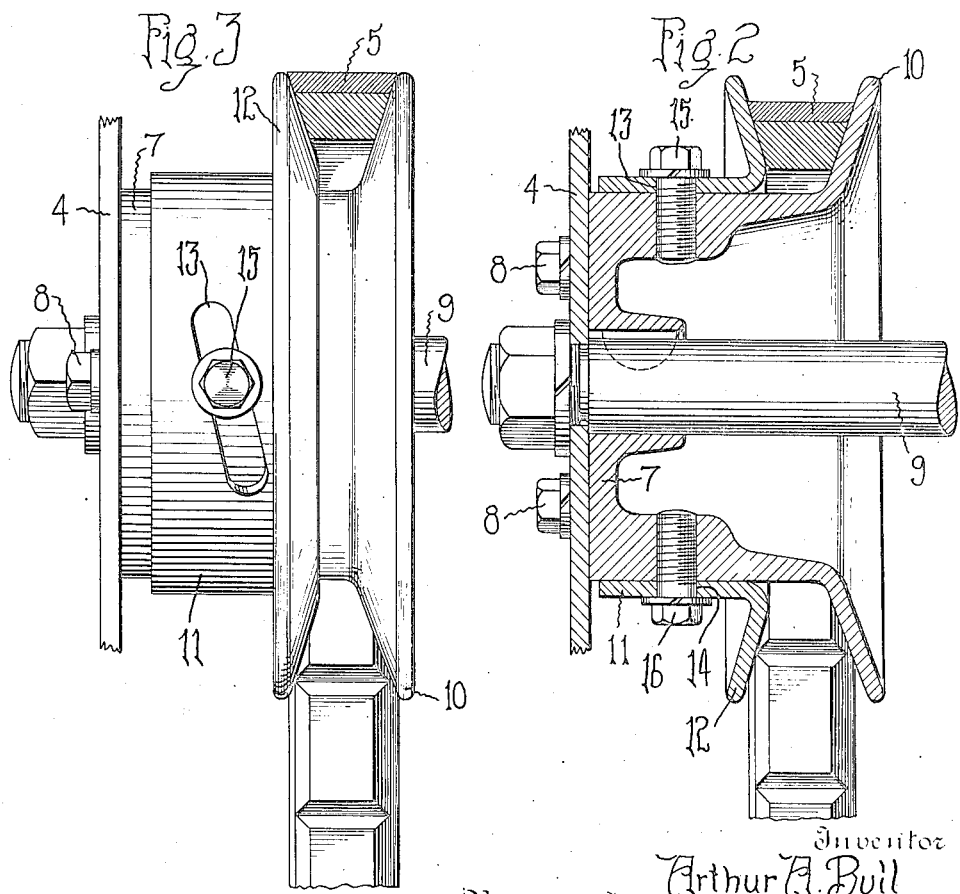
Inventor
Arthur A. Bull
By Attorneys Patented Feb. 6, 1923.

1,444,302

UNITED STATES PATENT OFFICE.

ARTHUR A. BULL, OF DETROIT, MICHIGAN, ASSIGNOR TO GENERAL MOTORS CORPORATION, OF DETROIT, MICHIGAN, A CORPORATION OF DELAWARE.

FAN PULLEY.

Application filed April 8, 1920. Serial No. 372,237.

*To all whom it may concern:*

Be it known that I, ARTHUR A. BULL, a subject of the King of Great Britain, and a resident of Detroit, county of Wayne, and State of Michigan, have invented certain new and useful Improvements in Fan Pulleys, of which the following is a full, clear, concise, and exact description such as will enable others skilled in the art to which the invention relates to make and use the same, reference being made therein to the accompanying drawings, which form a part of this specification.

This invention relates to certain improvements in pulleys, and although of general applicability whenever pulleys of this type may be employed it is of especial utility in connection with the pulleys used for driving fans which form part of the cooling apparatus of an automobile power plant.

It has heretofore been customary to adjust the tautness of the belt on a V type pulley by screwing a movable member of the pulley from or toward the opposite side, which is inherently a slow process. The present invention aims to overcome this objection and to simplify the construction and the adjustment of the belt by providing one member of the pulley with a slot or equivalent means, and the other member with a guide and clamping means adapted to co-operate with said slot. This construction enables the same results to be accomplished as would be obtained in the old construction, and at the same time provides a structure which may be more easily and cheaply manufactured.

Other objects and advantages will more fully appear from the following description:

In the accompanying drawings:

Figure 1 shows a side elevation of an internal combustion engine having a belt driven fan and the pulley which constitutes one embodiment of my invention adapted thereto.

Figure 2 is a sectional view through the pulley and showing the belt comparatively low in the groove.

Figure 3 is a view showing the pulley in elevation and the belt riding higher in the groove, due to the movement of the sleeve.

The drawings show a fan 4 driven by a belt 5, adapted to be actuated by an engine 6 and arranged to operate as part of the cooling system in the usual manner. The fan is bolted to a hub 7, which may be cast or otherwise formed as desired, by means of cap screws 8 and is keyed to the shaft 9, which supports the fan and pulley in a suitable bearing, not shown. A flange 10 on the hub 7 forms one side of the pulley and a sleeve 11, preferably stamped from sheet metal having another flange 12, forms the other side. In the stamped sleeve are two opposite slots 13 and 14, disposed at an angle to the plane of rotation and so arranged that the rotation of the member 11 causes longitudinal movement thereof on the hub due to the angular position of the slots. One or more slots may be used, but the preferred construction includes two, as best shown in Figure 2. By rotating the member 11 in one direction the distance between the beveled edges of the two flanges 10 and 12 is decreased, thereby causing the belt to ride higher on the pulley and tightening the belt. Rotating this member in the opposite direction causes a loosening of the fan belt.

In the hub 7 are two opposite guiding and securing members shown as screws 15 and 16, which determine the movement of the sleeve 11 by passing through the slots 13 and 14. The angle of the slots may be as great as desired to provide for the necessary adjustment. The guides may be arranged to screw into tapped holes in the hub 7, or may be secured thereto in any other convenient manner.

When the belt becomes too loose it is sufficient to unscrew the two guides which loosens the frictionally held sleeve 11, and by a slight turn of this sleeve, the distance between the flanges decreases due to the angularly disposed slots and causes the belt to ride higher on the pulley. The belt may be loosened by turning the sleeve in the opposite direction and increasing the distance between the two flanges, thereby causing the belt to ride lower on the pulley.

It will be seen that the provision of slots, disposed at an angle to the circumference and guiding and clamping means co-operating therewith, affords means whereby a quick, easy, and efficient adjustment may be obtained and whereby the cost of manufacture may be materally reduced.

It will be understood that many changes in the details of construction of the pulley and also of the guiding and adjusting means may be made by one skilled in the art without departing from the spirit of the invention, or from its scope as defined in the following claims.

I claim:—

1. A fan pulley, comprising a hub having an inclined projection, a sleeve rotatably and slidably mounted upon said hub and having an inclined projection, and an angularly disposed slot, a guide extending from said hub through said slot in said sleeve, and means engaging said sleeve for clamping said sleeve in fixed relation to said hub.

2. A fan pulley, comprising a hub having an inclined flange, a sleeve slidable upon said hub and having an inclined flange and a slot, and a threaded guide carried by said hub, passing through said slot and adapted to clamp the sleeve to the hub.

3. An expansible pulley, comprising an inner member, an outer member slidably mounted on said inner member, said members provided with means adapted to co-operate to form a belt receiving groove with inclined sides, one of said members having a slot, and means on the other member co-operating with said slot, whereby said members may be adjusted and secured to vary the width of the groove.

4. A pulley comprising two members slidably mounted with respect to each other, said members provided respectively with means between which a belt may be received, one of said members having a slot and means fixed with respect to the other member co-operating with said slot to permit relative adjustment of said members and secure them in adjusted relation.

5. A pulley comprising two members, so mounted as to be capable of relative rotative movement, said members provided respectively with means between which a belt may be received, one of said members having a slot, and the other having means co-operating with said slot whereby relative rotation of said members will cause an adjustment of the distance between said belt receiving means.

In testimony whereof I affix my signature.

ARTHUR A. BULL.